United States Patent
Stenfelt et al.

(10) Patent No.: US 9,497,668 B2
(45) Date of Patent: *Nov. 15, 2016

(54) PS TO CS HANDOVER INDICATOR

(71) Applicant: Telefonaktiebolaget L M Ericsson (publ), Stockholm (SE)

(72) Inventors: John Stenfelt, Göteborg (SE); Peter Hedman, Helsingborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/046,479

(22) Filed: Feb. 18, 2016

(65) Prior Publication Data

US 2016/0165489 A1 Jun. 9, 2016

Related U.S. Application Data

(63) Continuation of application No. 14/163,278, filed on Jan. 24, 2014, now Pat. No. 9,301,212, which is a
(Continued)

(51) Int. Cl.
*H04W 36/00* (2009.01)
*H04W 8/08* (2009.01)

(52) U.S. Cl.
CPC ......... *H04W 36/0022* (2013.01); *H04W 8/087* (2013.01); *H04W 36/0005* (2013.01); *H04W 36/0011* (2013.01)

(58) Field of Classification Search
CPC ..................... H04W 8/087; H04W 36/0005–36/0022; H04W 36/005; H04W 36/12; H04W 40/36
See application file for complete search history.

(56) References Cited

U.S. PATENT DOCUMENTS

| 8,675,607 B2 | 3/2014 | Stenfelt et al. |
| 9,301,212 B2 | 3/2016 | Stenfelt et al. |

(Continued)

OTHER PUBLICATIONS

Author Unknown, "Technical Specification Group Services and System Aspects; Study on Circuit Switched (CS) Domain services over evolved Packet Switched (PS) access; Stage 2 (Release 9)," Technical Report 23.879, Version 9.0.0, 3GPP Organizational Partners, Mar. 2009, 60 pages.

(Continued)

*Primary Examiner* — Awet Haile
*Assistant Examiner* — Eric Myers
(74) *Attorney, Agent, or Firm* — Withrow & Terranova, PLLC

(57) ABSTRACT

The present invention relates to a solution for handling handover of connections for a user equipment from a packet switch network to a circuit switched network. This is provided as a method implemented in a node and system. The method is provided in a telecommunications network connecting user equipment, i.e. UE, communicating wirelessly with the network. The method comprising steps of detecting that handover is required from a packet switched, i.e. PS, based network to a circuit switched, i.e. CS, based network, initiating in a source mobility management node a single radio voice call continuity, i.e. SVRCC, initiating a PC to CS handover for non-voice components with information about voice related parameters and a PS to CS handover indicator, executing hand over, sending an update request to a serving gateway, i.e. SGW, from a target mobility management node with non-voice related parameters and the PS to CS handover indicator, forwarding the update request from the SGW to a packet data network gateway, i.e. PGW, receiving the update request in the PGW, detecting the PS to CS handover indicator, and handling in the PGW the PS to CS handover indicator.

16 Claims, 5 Drawing Sheets

Related U.S. Application Data continuation of application No. 13/264,790, filed as application No. PCT/EP2010/055211 on Apr. 20, 2010, now Pat. No. 8,675,607.

(60) Provisional application No. 61/171,918, filed on Apr. 23, 2009.

(56) References Cited

U.S. PATENT DOCUMENTS

| | | | |
|---|---|---|---|
| 2008/0026752 A1 | 1/2008 | Flore et al. | |
| 2008/0316972 A1* | 12/2008 | Shaheen | H04W 36/0033 370/331 |
| 2009/0257418 A1 | 10/2009 | Allen et al. | |
| 2009/0270097 A1* | 10/2009 | Gallagher | H04W 8/08 455/435.1 |
| 2010/0040020 A1* | 2/2010 | Chen | H04W 36/0022 370/331 |
| 2010/0130207 A1* | 5/2010 | Wu | H04W 36/0066 455/436 |
| 2012/0039303 A1 | 2/2012 | Stenfelt et al. | |
| 2014/0140324 A1 | 5/2014 | Stenfelt et al. | |

OTHER PUBLICATIONS

Author Unknown, "Technical Specification Group Services and System Aspects; General Packet Radio Service (GPRS); Service description; Stage 2 (Release 9)," Technical Specification 23.060, Version 9.0.0, 3GPP Organizational Partners, Mar. 2009, 275 pages.

Author Unknown, "Technical Specification Group Services and System Aspects; Single Radio Voice Call Continuity (SRVCC); Stage 2 (Release 8)," Technical Specification 23.216, Version 8.1.0, 3GPP Organizational Partners, Sep. 2008, 30 pages.

Author Unknown, "Technical Specification Group Services and System Aspects; IP Multimedia Subsystem (IMS); Stage 2 (Release 8)," Technical Specification 23.228, Version 8.8.0, 3GPP Organizational Partners, Mar. 2009, 248 pages.

T-Mobile et al., "TD S2-090817: Cleanup of Section 5.22 in TR 23.879," Temporary Document, 3rd Generation Partnership Project (3GPP), TSG SA WG2 Meeting #70, Jan. 12-16, 2009, 18 pages, Phoenix, Arizona.

International Search Report and Written Opinion for International Patent Application No. PCT/EP2010/055211, mailed Jul. 15, 2010, 7 pages.

International Preliminary Report on Patentability for International Patent Application No. PCT/EP2010/055211, mailed Nov. 3, 2011, 6 pages.

Non-final Office Action for U.S. Appl. No. 13/264,790, mailed Apr. 23, 2013, 18 pages.

Notice of Allowance for U.S. Appl. No. 131264,790, mailed Oct. 25, 2013, 11 pages.

Notice of Allowance and Examiner-Initiated Interview Summary for U.S. Appl. No. 14/163,278, mailed Nov. 20, 2015, 11 pages.

\* cited by examiner

PS TO CS HANDOVER INDICATOR

This application is a Continuation of U.S. patent application Ser. No. 14/163,278, filed Jan. 24, 2014, which is a Continuation of U.S. patent application Ser. No. 13/264,790, filed Oct. 17, 2011, now U.S. Pat. No. 8,675,607, which is a 35 USC 371 National Phase application of PCT/EP2010/055211 filed Apr. 20, 2010, which claims the benefit of U.S. provisional patent application No. 61/171,918, filed Apr. 23, 2009, the disclosures of which are incorporated herein by reference in their entireties.

TECHNICAL FIELD

The present invention relates to a solution for handling handover of connections for a user equipment from a packet switch network to a circuit switched network.

BACKGROUND

In evolved Universal terrestrial radio access network (EUTRAN) both real time IP multimedia Subsystem (IMS) and non-real time services such as Internet access may be provided using the Evolved Packet Core (EPC). EUTRAN coverage will initially be limited and thus existing voice data and data calls must be possible to hand over to e.g. UTRAN and GERAN. UTRAN/GERAN network deployments usually rely on legacy a circuit switched (CS) Core Network for handling voice calls while e.g. non-real time data services may be provided over a GPRS Core network. The deployment of parallel CS infrastructure in the market to support UTRAN and GERAN voice calls is expected to continue to exist for a long time.

To be able to handle this scenario an optional functionality called Single Radio Voice Call Continuity (SRVCC) has been defined in 3GPP release 8 in TS 23.2016 and TS 23.216.

TS 23.216 describes stage 2 functionality for SRVCC between EUTRAN access and 3GPP 1×CS and between EUTRAN access and 3GPP UTRAN/GERAN accesses and between UTRAN (HSPA) access and 3GPP UTRAN/GERAN accesses for circuit switched calls that are anchored in the IMS.

GPRS includes a preservation function, which allows an active PDP context associated with released Radio access bearers (RAB) to be preserved in the core network (CN) when a UE goes out of coverage. The RABs can then be re-established at a later stage when a UE comes back into coverage. PDP contexts associated with a guaranteed bit rate (GBR) Quality of Service (QoS) are preserved when the maximum bit rate (MBR) for uplink and downlink is set to 0 kbit/s.

When SRVCC is performed from EUTRAN to UTRAN/GERAN with dual transfer mode (DTM) packets switched (PS) handover support, as described in TS 23.216 section 6.2.2.2, there exists a potential race condition that may result in the voice call being dropped prematurely. A mobility management entity (MME) differentiates or "splits" the voice bearers from all other PS bearers and initiates their relocation towards a MSC server and an SGSN. After some time the MSC server, or MGW, initiates a session transfer towards IP multimedia Subsystem (IMS), the IMS, or a P-CSCF, will update service session information in a PCRF by removing affected media components using an Rx interface—step "A".

In parallel to this procedure, the MSC server/MGW responds to the handover request to the source MME, which in turn initiates a handover command to the UE. The UE then tunes into UTRAN/GERAN and the handover is completed. Finally, an S4-SGSN updates bearers with a serving gateway (SGW). The SGW forwards the request to a Packet data network gateway (PGW). Since the voice bearers can not be established by the S4-SGSN the S4-SGSN will release those bearers by triggering a bearer context de-activation towards the SGW and PGW. When the PGW receives an indication that the voice bearers have been de-activated it will report this to the PCRF over a Gx interface—step "B".

The PCRF will now be able to match the information received over Rx with the information over Gx and take the necessary action, e.g. to remove the installed PCC rule in the PGW.

However, in these procedures step "B" may sometimes occur before step "A". If this is the case the PCRF will have to assume that the voice bearer has been lost and report this to the P-CSCF. TS23.228 describes that the P-CSCF may actually initiate release of the whole IMS session in case of a bearer related to the IMS is lost.

The preservation function as described in TS 23.060 us not supported in EUTRAN EPS, but it could be added to EPS as well; however, then the whole QoS information element (IE) would have to be sent when indicating that the bearer has been preserved—HO to PS. Allowing the QoS IE to be sent from the MME/S4-SGSN will eventually lead to a risk of allowing QoS updates from MME/S4-SGSN which adds a considerable amount of complexity in the PGW.

SUMMARY

It is therefore an object of the present invention to address some of these problems. This is done by introducing a new indicator in a GPRS tunneling version 2 protocol that is used to signal:

1. From source MME to the target S4-SGSN in case of EUTRAN to UTRAN/GERAN handover over the S3 interface, and
2. from source S4-SGSN to target S4-SGSN in case of SGSN relocation in UTRAN/GERAN over a S16 interface, and
3. from S4-SGSN to target SGW over an S4 interface, and
4. from SGW to PGW over an S5/S8 interface, that the EPS bearer related voice has been handed over to the CS domain, e.g. according to the principles of SRVCC.

The solution according to the present invention is provided in a number of aspects, in which a first is a method in a telecommunications network connecting user equipment, i.e. UE, communicating wirelessly with the network. The method comprises steps of detecting that handover is required from a packet switched (PS) based network to a circuit switched (CS) based network, initiating in a source mobility management node a single radio voice call continuity (SVRCC), initiating a PC to CS handover for non-voice components with information about voice related parameters and a PS to CS handover indicator, executing hand over, sending an update request to a serving gateway (SGW) from a target mobility management node with non-voice related parameters and the PS to CS handover indicator, forwarding the update request from the SGW to a packet data network gateway (PGW), receiving the update request in the PGW, detecting the PS to CS handover indicator, and handling in the PGW the PS to CS handover indicator.

The step of handling in the PGW may comprise waiting for a decision from a policy and charging rules function node (PCRF). The method may further comprise steps of receiving a decision from the PCRF to remove authorization for an associated voice call service and freeing up bearer resources.

The step of handling in the PGW may comprise transmitting the PS to CS handover indicator information to a policy and charging rules function node. The source and/or target mobility management node may be one of MME or SGSN.

The handover may be required from an E-UTRAN or from a UTRAN-HSPA based network to a UTRAN/GERAN based network.

The step of initiating handover may be executed with a forward relocation request message. The method may further comprise steps of receiving in the PGW an indication that voice services are not any longer authorized in the PS domain and freeing up resources in the PGW.

Another aspect of the present invention is provided, a node in a telecommunications network connecting user equipment (UE) wirelessly to the network. The node may be configured to receive an update request from a serving gateway (SGW) in relation to a single radio voice call continuity event (SRVCC) when handover is required from a packet switched (PS) based network to a circuit switched (CS) based network, wherein the node may further be configured to detect a PS to CS handover indicator related to voice components in the update request, and to handle the PS to CS handover indicator.

The node may be configured to wait for a decision from a policy and charging rules function node (PCRF) or configured to transmit information related to the PS to CS handover indicator to the PCRF. The node may be a packet data network gateway node.

Yet another aspect of the present invention is provided, a system in a telecommunications network. The system comprising a packet data network gateway (PGW), a mobility management node (MME), and a serving gateway node (SGW). The MME may be arranged to obtain a handover required message for a user equipment, to initiate bearer splitting of voice and non-voice components, and to send an update request to the SGW which is arranged to forward the update request to the PGW, wherein the update request comprises both non-voice related parameters and a packet switched to circuit switched handover indicator.

Advantages of the present invention are that it efficiently resolves a race condition for IMS that may result in unnecessary loss of ongoing phone calls. The indicator as such is advantageously mandatory in order to support SRVCC in the EPC. This means that support may be needed in all of the following network nodes: MME, S4-SGSN, SGW, PGW and potentially in the PCRF.

Introducing a separate indicator instead of re-using the preservation indication as part of the QoS IE will avoid future problems with introducing QoS updates from the MME/S4-SGSG which would add a considerable amount of complexity in the PGW. It also avoids introduction of a complete preservation mechanism in EPS, which would have caused a large amount of confusion in GPRS.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
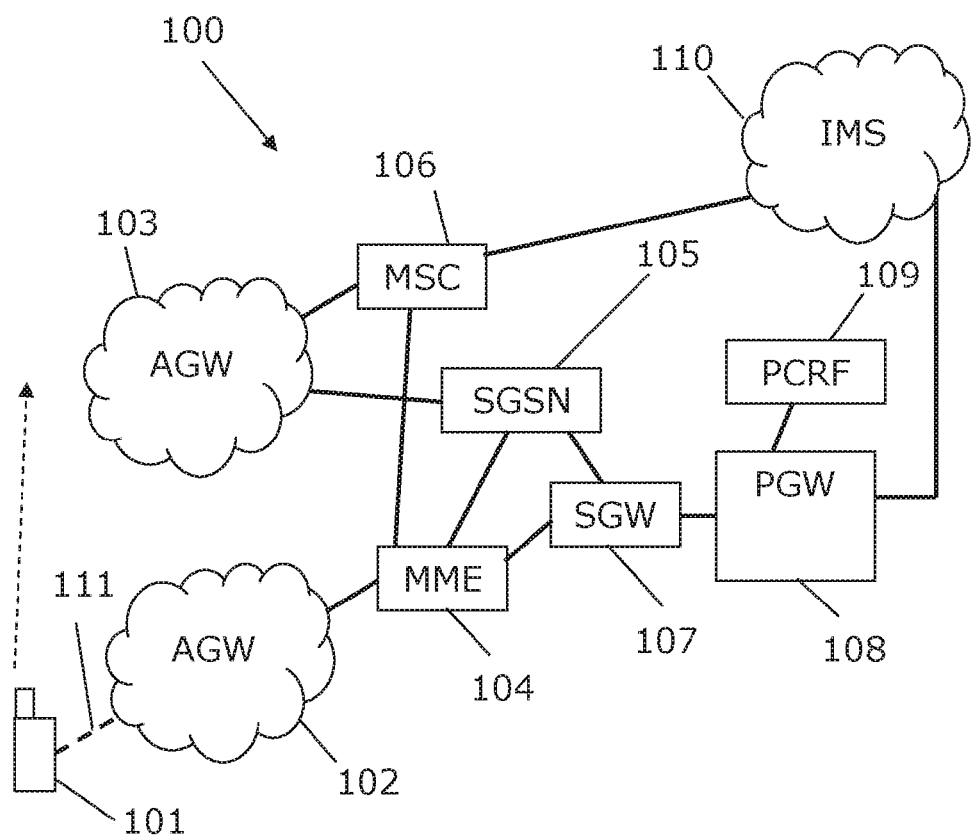
FIG. 1 illustrates schematically a network according to the present invention.

In FIG. 1 reference numeral 100 generally indicate a telecommunications core network according to the present invention. The network comprises a core network comprising a mobility management node, a gateway, and a policy and charging rules function node. The present invention addresses issues during handover between two different radio access technologies. In the example shown in FIG. 1, a handover from a 3GPP EUTRAN based network to a 3GPP UTRAN/GERAN based network is shown. In the network example of FIG. 1 a UE 101 is attached to a EUTRAN based access network 102 (AGW) which provides access to the core network 100. In the core network a mobility management entity (MME) 104 provides mobility handling for the UE and takes part in the transfer of for instance voice session to the UTRAN/GERAN based access network 103. Furthermore, the network comprises an SGSN 105, serving gateway (SGW) 107, packet data network gateway (PGW) 108, Policy and charging rules function node (PCRF) 109, and a mobile switching center (MSC) 106 handling voice related issues in the UTRAN/GERAN network part. The network is also connected to an IP multimedia subsystem (IMS) 110.

The present invention handles a situation where handover of voice bearer is to be performed from a network with both voice and non-voice bearer capability to a network primarily handling voice bearers. The present invention is applicable both at Single Radio Voice Call Continuity (SRVCC) from EUTRAN to UTRAN/GERAN and at SRVCC from UTRAN (HSPA) to UTRAN/GERAN.

Figure 2:
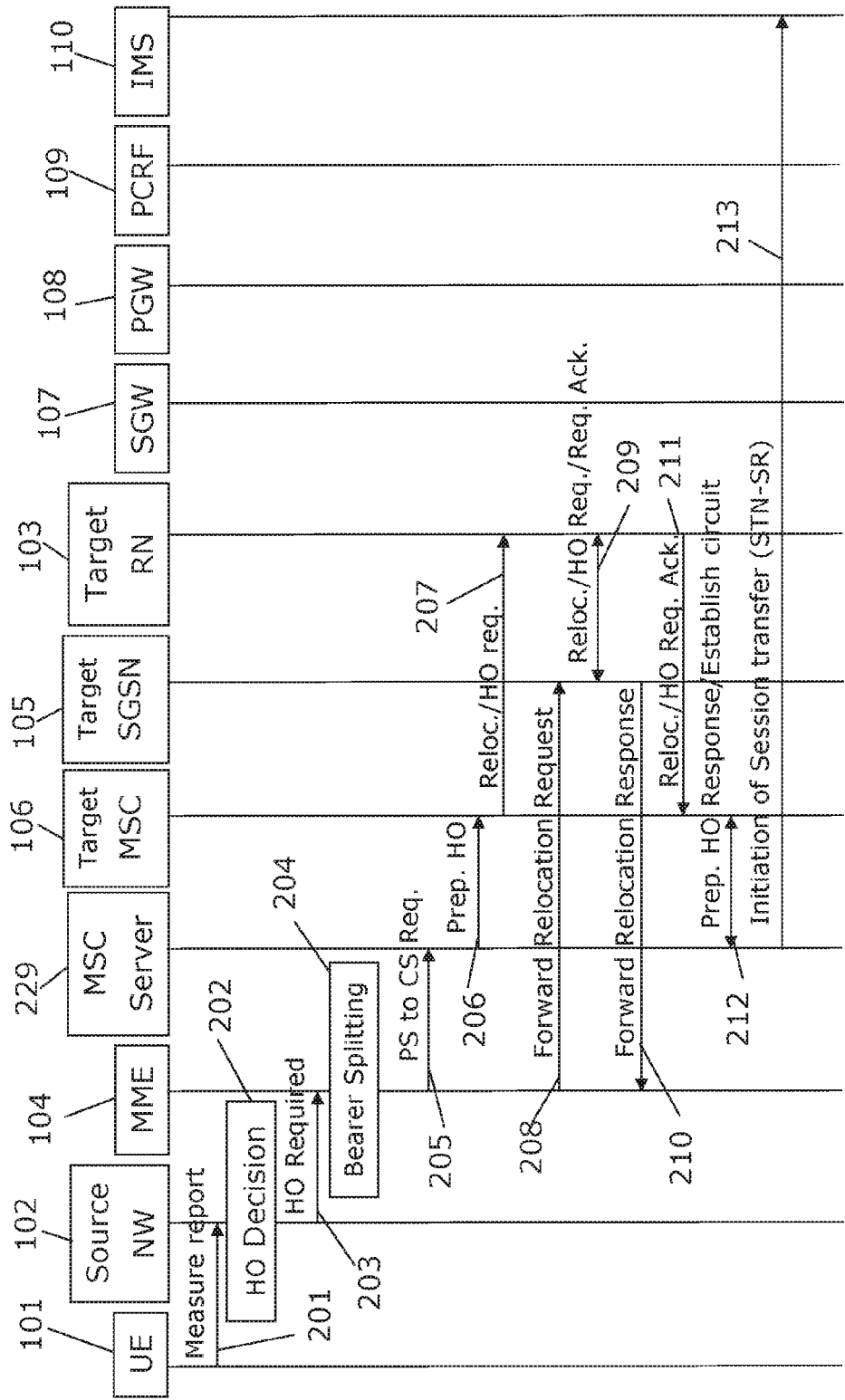
FIG. 2 illustrates schematically in a sequence diagram interaction between network nodes according to the present invention.
Figure 2:
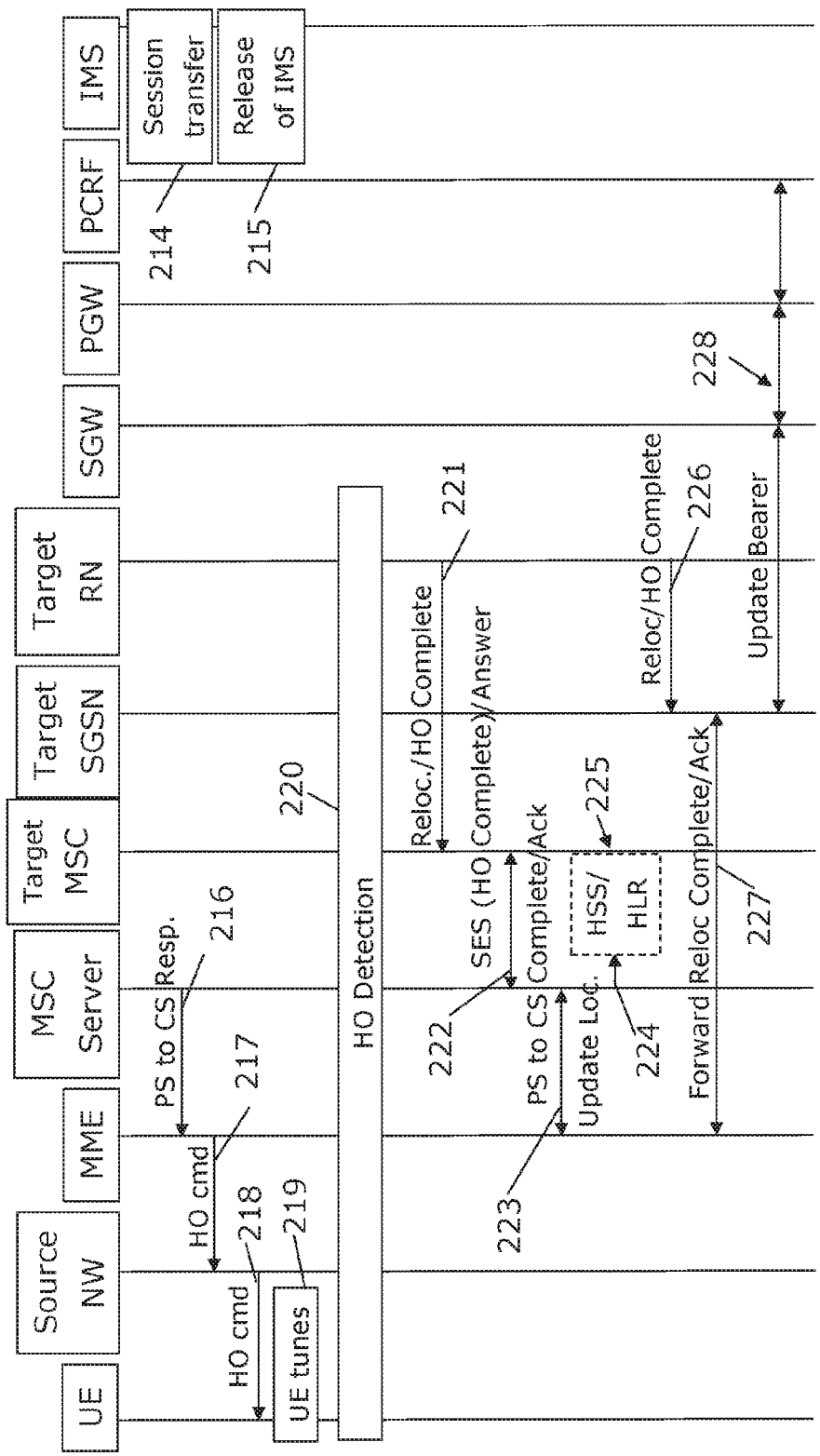

With reference to FIG. 2, an example of sequence flow of a SVRCC from EUTRAN to UTRAN/GERAN with dual transfer mode (DTM) and Packet switched (PS) handover (HO) support is shown. Even though SVRCC from EUTRAN to UTRAN is exemplified it should be noted that the present invention is also valid for the case of SRVC from UTRAN with High Speed Packet Access (HSPA) to UTRAN/GERAN with DTM HO when an S4 based SGSN is used.

FIG. 2 illustrates in a sequence diagram a handover situation from EUTRAN to UTRAN/GERAN with DTM HO. The UE 101 sends 201 one or several measurement reports to the source network 102 (e.g. EUTRAN) indicating link quality and depending on the content of the reports the source network (NW) takes a handover decision 202 and decides to trigger an SRVCC handover to UTRAN/GERAN. The source NW sends 203 a handover (HO) required message comprising information about target ID, generic source to target transparent container, optionally additional parameters, and an indication that this is for CS+PS handover to the MME 104 which in turn takes a decision 204 of bearer splitting, i.e. separating voice and data connections, and initiates the bearers relocation towards an MSC server and SGSN. The MME (source) sends 205 a message indicating packet switched (PS) to Circuit Switched (CS) handover request to the MSC server/Media gateway (MGW) 229. The MSC/MGW server sends 206 a prepare HO message to the target MSC 106. The target MSC sends 207 a relocation/ handover request to a target Radio Area network (RN) 103. In one embodiment the steps 205-207 may comprise in more detail that the Source MME initiates the PS-CS handover procedure for the voice bearer by sending a SRVCC PS to CS Request (Target ID, STN-SR, MSISDN, Source to Target Transparent Container, MM Context) message to the MSC Server. The MSC server is selected based on the Target ID received in the Handover Required message. The Target ID is also used by the MSC Server to identify the target RNS/BSS. The message includes information relevant to the CS domain only. MME received STN-SR and MSISDN from the HSS as part of the subscription profile downloaded during the EUTRAN attach procedure. MM Context contains security related information. CS security key is derived by the MME from the EUTRAN/EPS domain key. The CS Security key is sent in the MM Context. MSC Server interworks the PS-CS handover request with a CS inter-MSC handover request by sending a Prepare Handover Request message to the target MSC. Target MSC requests resource allocation for the CS relocation by sending the Relocation Request/Handover Request (additional Source to Target Transparent Container) message to the target RNS/BSS.

The MME sends 208 a forward relocation request to the target SGSN 105. This forward relocation request comprises EPS bearer information not only for non-voice components but also information on the voice related bearers with an indicator that they have been handed over to the CS domain; e.g. the request may comprise source to target transparent container, MM context, and PDN connections. This indicates that the target S4-SGSN does not need to try to establish Radio Access Bearers (RAB) for these bearers. The target SGSN exchanges 209 Relocation/handover request and request acknowledgements with the target radio network (RNS)/Base station (BSS) subsystem 103. The target SGSN will then send 210 a forward relocation response to the MME. The target RN sends 211 a relocation/handover request acknowledgement message to the target MSC also. In response to this the target MSC and MSC server exchanges 212 prepare handover response and establishment circuit messages. The MSC server then sends 213 a message for initiation of session transfer (STN-SR) to the IP multimedia subsystem (IMS) and the MSC server also sends 216 a PS to CS response message to the MME. Meanwhile, the IMS will handle session transfer issues and update remote leg 214 and release of IMS access leg 215. The MME will send 217 a handover command to the source network which in turn sends 218 a handover from EUTRAN command to the UE whereby the UE tunes 219 into the UTRAN/GERAN network.

Handover detection is then performed 220 in the UE, Source NW, MME, MSC server, target MSC, SGSN and target RN.

The target RN sends 221 a relocation/handover complete message to the target MSC and the target MSC exchanges 222 speech enabled services (SES) handover messages with the MSC server. The MSC server exchanges 223 PS to CS complete acknowledgement messages with the MME and sends 224 an update location message to appropriate Home subscriber server (HSS) or home location register (HLR) 225. The target RN sends 226 a relocation/handover complete message to the SGSN which in turn exchanges 227 forward relocation complete acknowledgement messages with the MME. Finally, the SGSN, SGW, PGW, and PCRF exchanges 228 update bearer messages which comprise information on voice related bearer together with the handover indicator which indicates that the voice bearers have been handed over to the CS domain. The update bearer messages originate from the SGSN and sent to the SGW but may be forwarded to the PGW and the PCRF. Target SGSN may update bearers with SGW; the PS to CS HO indicator is set for the voice bearer(s).

It should be noted, that in case of Gn/Gp SGSN, the PS to CS indicator may not be signalled for the voice bearer(s). Instead a multiple bit rate (MBR) parameter may be set equal to zero to indicate HO to the CS domain.

The PGW is thus informed of the situation and is aware of which bearers that have been handed over to the CS domain. Either the PGW may directly forward this information to the PCRF, comprising the handover indicator, or it may await the PCRF decision to remove authorization for the associated voice call service over Gx. When this happens the PGW will free up potential resources internally associated to the bearers.

Figure 3:
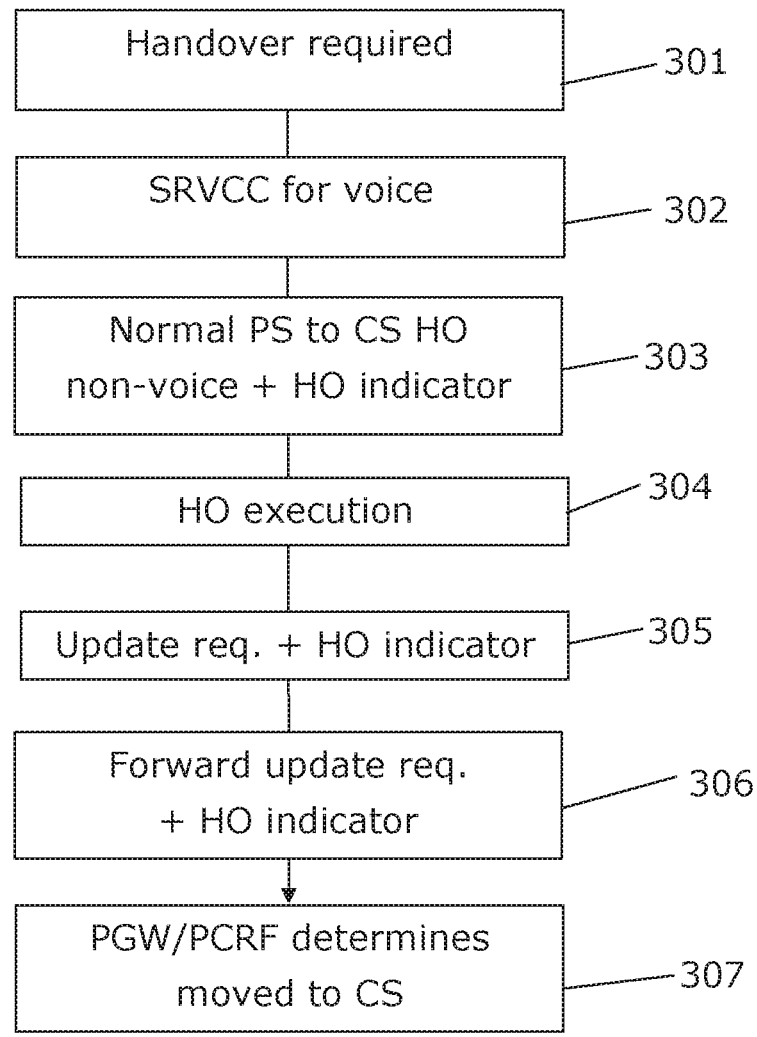
FIG. 3 illustrates schematically in a block diagram a method according to the present invention.

With reference to FIG. 3, the following method steps show a general example of the present invention:

301. A UE with both and non-voice bearers is currently in EUTRAN or in UTRAN (HSPA) when the serving networks detect that a handover (HO) to UTRAN/GERAN is required.

302. Since the target network (NW) relies on legacy circuit switched (CS) domain for voice the source mobility management entity (MME) or source S4-SGSN initiates SRVCC to target MSC server for the voice bearer (component).

303. In parallel an ordinary PS to PS handover is initiated for the non-voice bearers. However, the voice bearers are included but the PS to CS handover indicator is set.

304. The handover is then executed, i.e. the UE switch to UTRAN/GERAN.

305. The target S4-SGSN sends an update request to the SGW comprising the successfully established non-voice bearers and PS to CS indicator set for the voice bearers.

306. The SGW forwards the message to the PGW.

307. The PGW receives the request. The PGW learns by means of the PS to CS indicator that the voice bearers have been handed over to the CS domain. Either the PGW awaits the PCRF decision or reports the information to the PCRF.

Figure 4:
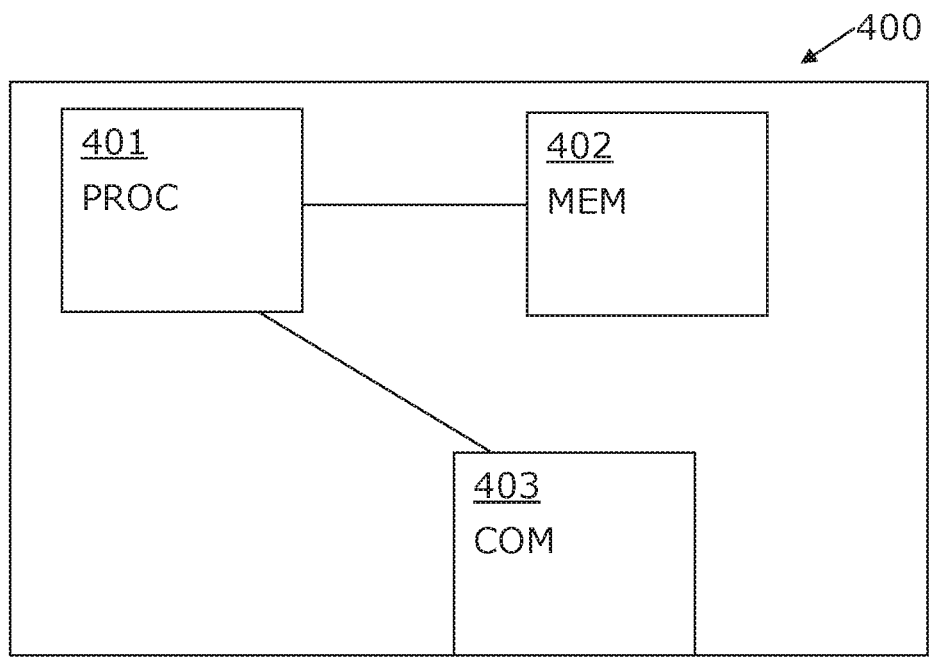
FIG. 4 illustrates schematically in a block diagram a device according to the present invention.

FIG. 4 shows a node 400 in the telecommunications network infrastructure arranged to handle parts of the method according to the present invention. The node comprises at least one processor 401, at least one memory unit 402, and at least one communication interface 403. The processor may comprise any suitable type of processing unit, such as for instance a microprocessor, digital signal processor (DSP), application specific integrated circuit (ASIC), or field programmable gate array FPGA). The processor is arranged to execute instruction sets, such as software or hardware instruction sets. For instance software instructions may be stored in the memory unit which may comprise a volatile or non-volatile memory type. The memory unit may comprise any suitable memory being of computer readable storage type, e.g. hard disk, RAM, EPROM, Flash, and so on. The memory may also be utilized for intermediate storage of statistics, software data, and so on. Furthermore, the processor is arranged to utilize the communication interface to communicate with other nodes in the network. The communication interface is preferably of a packet type and preferably utilizes a common standardised protocol such as for instance Ethernet. All nodes in the infrastructure network comprise similar hardware architecture. In the present invention, the MME, the SGSN and the PGW use the handover indicator in the handover process.

The present invention may be utilized in a number of different situations/network configurations. The handover indicator is used in GPRS tunneling version 2 protocol and may be applicable to at least one of the following situations and the indicator is used to signal:

1. From source MME to the target S4-SGSN in case of EUTRAN to UTRAN/GERAN handover over the S3 interface, and
2. from source S4-SGSN to target S4-SGSN in case of SGSN relocation in UTRAN/GERAN over a S16 interface, and
3. from S4-SGSN to target SGW over an S4 interface, and
4. from SGW to PGW over an S5/S8 interface, that the EPS bearer related voice has been handed over to the CS domain, e.g. according to the principles of SRVCC.

Based on this information either the PGW may take local action or it could forward this information to the PCRF.

In case of local action the PGW may e.g. avoid to inform the PCRF that the bearer resources related to the voice bearer bas been lost (case 1). Alternatively, the PGW may inform the PCRF that the bearer has been lost, but hen the indicator is passed along over the Gx interface (case 2). For case 2 the PCRF may respond to the PGW with an updated policy decision.

Eventually, the PCRF will receive information over the Rx interface that the voice is no longer authorized in the PS domain.

For case 1, the PCRF will then notify the PGW over Gx interface that the service is no longer authorized. The PGW may then free up resources internally.

For case 2, the PCRF will correlate the information received over Rx interface with the information received over Gx interface. If necessary the PCRF will update its policy decision towards the PGW.

In both cases the race condition described in the background section is avoided.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

3GPP 3rd Generation Partnership Project
AGW Access Gateway
APN Access Point Name
ARP Allocation and Retention Priority
BSC Base station controller
BSS Base station subsystem
DTM dual transfer mode
eNB evolved Node B
EPC Evolved packet core
EPS Evolved Packet System
E-UTRAN Evolved UTRAN
GBR Guaranteed bit rate
GCS Gateway Control Session
GGSN Gateway GPRS support node
GPRS General Packet Radio Service
GTP GPRS Tunneling Protocol
GW Gateway
HI Handoff Indicator
HLR Home location register
HO Handover/Handoff
HSPA High Speed Packet Access
ICS IP-CAN Session
IE Information element
IMS IP multimedia Subsystem
IP Internet Protocol
IP-CAN IP-Connectivity Access Network
MBR Multiple bit rate
MGW Media Gateway
MME Mobility management entity
MSC Mobile switching center
PBA Proxy binding Acknowledgement
PBU Proxy binding Update
PCC Policy and Charging Control
PCEF Policy and Charging Enforcement Function
PCRF Policy and charging rules function
PDN GW Packet Data Network Gateway
PDN Packet Data Network
PDP Packet data protocol
PMIP Proxy Mobile IP
QoS Quality of Service
RAT Radio access technology
RNC Radio network controller
RNS Radio Network Subsystem
SAE System Architecture Evolution
SGSN Serving GPRS support node
SRVCC Single Radio Voice Call Continuity
UE User Equipment
UMTS Universal Mobile telecommunications system
UTRAN Universal terrestrial radio access network

The invention claimed is:

1. A node to be used in a telecommunications network, the telecommunications network connecting user equipment, UE, wirelessly to the telecommunications network, wherein the node comprises:
   at least one processor; and
   memory containing instructions executable by the at least one processor whereby the node is configured to:
      receive an update message in relation to a single radio voice call continuity event, SRVCC, when handover is required from a packet switched, PS, based network to a circuit switched, CS, based network, which update message comprises a PS to CS indicator indicating that voice bearers have been handed over to the CS domain.

2. The node of claim 1 wherein the node is configured to receive the update message from a target mobility management node.

3. The node of claim 2 wherein the update message includes both the PS to CS indicator and non-voice related parameters.

4. The node of claim 2 wherein the target mobility management node is a mobility management entity.

5. The node of claim 2 wherein the target mobility management node is a serving general packet radio service support node, SGSN.

6. The node of claim 1 wherein the node is a serving gateway.

7. The node of claim 1 wherein the handover is required from an evolved universal terrestrial radio access network, E-UTRAN, based network to a universal terrestrial radio access network/global system for mobile communications enhanced data rates for global evolution radio access network, UTRAN/GERAN, based network.

8. The node of claim 1 wherein the handover is required from a universal terrestrial radio access network-high speed packet access, UTRAN-HSPA, based network to a universal terrestrial radio access network/global system for mobile communications enhanced data rates for global evolution radio access network, UTRAN/GERAN, based network.

9. A method of operation of a node in a telecommunications network connecting user equipment, UE, wirelessly to the telecommunications network, comprising:
receiving, by the node, an update message in relation to a single radio voice call continuity event, SRVCC, when handover is required from a packet switched, PS, based network to a circuit switched, CS, based network, which update message comprises a PS to CS indicator indicating that voice bearers have been handed over to the CS domain.

10. The method of claim 9 wherein receiving the update message comprises receiving the update message from a target mobility management node.

11. The method of claim 10 wherein the update message includes both the PS to CS indicator and non-voice related parameters.

12. The method of claim 10 wherein the target mobility management node is a mobility management entity.

13. The method of claim 10 wherein the target mobility management node is a serving general packet radio service support node, SGSN.

14. The method of claim 9 wherein the node is a serving gateway.

15. The method of claim 9 wherein the handover is required from an evolved universal terrestrial radio access network, E-UTRAN, based network to a universal terrestrial radio access network/global system for mobile communications enhanced data rates for global evolution radio access network, UTRAN/GERAN, based network.

16. The method of claim 9 wherein the handover is required from a universal terrestrial radio access network-high speed packet access, UTRAN-HSPA, based network to a universal terrestrial radio access network/global system for mobile communications enhanced data rates for global evolution radio access network, UTRAN/GERAN, based network.

* * * * *

UNITED STATES PATENT AND TRADEMARK OFFICE
CERTIFICATE OF CORRECTION

PATENT NO.          : 9,497,668 B2                              Page 1 of 1
APPLICATION NO.     : 15/046479
DATED               : November 15, 2016
INVENTOR(S)         : Stenfelt et al.

It is certified that error appears in the above-identified patent and that said Letters Patent is hereby corrected as shown below:

On the Title Page

In item (57), under "ABSTRACT", in Column 2, Line 11, delete "SVRCC," and insert -- SRVCC, --, therefor.

In the Specification

In Column 1, Line 4, delete "2014," and insert -- 2014, now Pat. No. 9,301,212, --, therefor.

In Column 2, Line 22, delete "23.060 us" and insert -- 23.060 is --, therefor.

In Column 2, Line 55, delete "(SVRCC)," and insert -- (SRVCC), --, therefor.

In Column 4, Line 41, delete "SVRCC" and insert -- SRVCC --, therefor.

In Column 4, Line 43, delete "SVRCC" and insert -- SRVCC --, therefor.

In Column 4, Line 45, delete "SRVC" and insert -- SRVCC --, therefor.

In Column 6, Line 8, delete "multiple bit rate (MBR)" and insert -- maximum bit rate (MBR) --, therefor.

In Column 6, Line 30, delete "PS TO PS" and insert -- PS TO CS --, therefor.

In Column 7, Line 23, delete "hen" and insert -- then --, therefor.

In Column 8, Line 16, delete "MBR Multiple bit rate" and insert -- MBR Maximum bit rate --, therefor.

Signed and Sealed this
Seventh Day of March, 2017

Michelle K. Lee
*Director of the United States Patent and Trademark Office*